Dec. 24, 1968 M. P. YOUNG 3,418,634
DELAY LINE SWITCH PREFIRE AND FAILURE INDICATING SYSTEM
Filed May 18, 1965
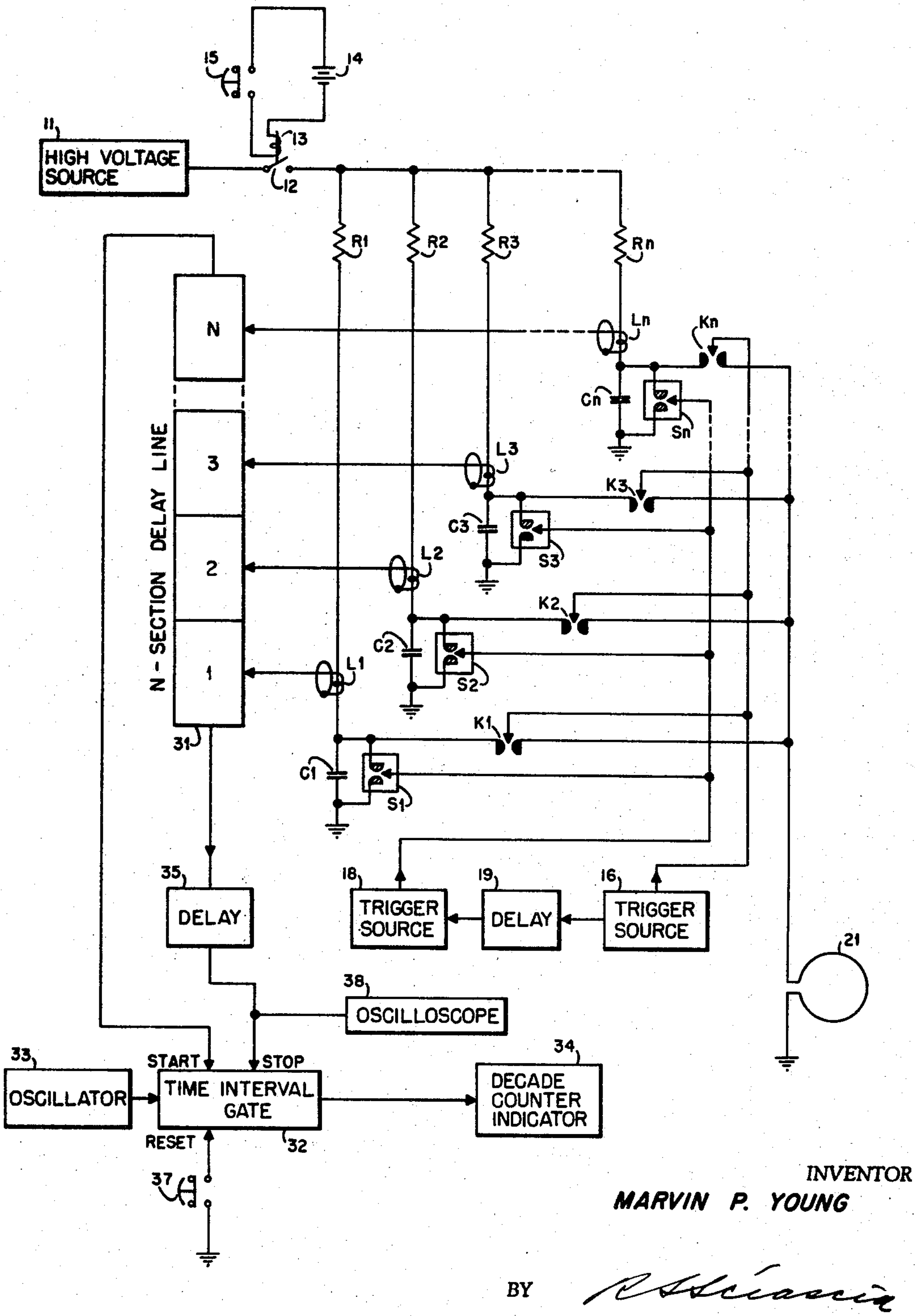
INVENTOR
MARVIN P. YOUNG
BY
ATTORNEY United States Patent Office 3,418,634
Patented Dec. 24, 1968

3,418,634
DELAY LINE SWITCH PREFIRE AND FAILURE INDICATING SYSTEM

Marvin P. Young, Alexandria, Va., assignor to the United States of America as represented by the Secretary of the Navy Filed May 18, 1965, Ser. No. 456,871
9 Claims. (Cl. 340—147)

The invention described herein may be manufactured and used by or for the Government of the United States of America for governmental purposes without the payment of any royalties thereon or therefor.

The present invention relates to an indicating system and more particularly to a system for detecting and specifically indicating which switch of a series of switches associated with a capacitor bank has prefired or failed to fire.

High energy capacitor storage banks discharging into a low inductance load usually employ a large number of starting switches operating in parallel to connect the capacitors to the load. In addition, a vacuum switch, employed because of triggering requirements, is connected directly across each capacitor for short circuiting the capacitor at the first current maximum. The short circuiting or clamping of the capacitor at the maximum current of an oscillating discharge is often referred to in the field of plasma physics as a "crowbar" technique. Hence each of the vacuum switches connected directly across the capacitor is known as a "crowbar" switch. For purposes of description, however, these vacuum switches which are connected directly across each storage capacitor are referred to as clamping switches. Ordinarily, the starting switches are triggered simultaneously to discharge the capacitors into the load. Then the clamping switches are simultaneously triggered after a fixed delay to short circuit the capacitors at the first current maximum. However, with a large number of clamping switches being utilized there is a good probability that a weak switch will prefire due to the bank voltage. In practice, a common vacuum system is employed for all the switches and the prefiring of one switch gives rise to a pressure pulse which causes the other switches to reach a condition in which they will also prefire. Ordinarily the travel time of the pressure pulse to the other vacuum switches is in the order of milliseconds. Because of the high energy involved, the capacitors are usually housed in a secured room out of the operator's view so that an accurate and reliable indicating system in a control room external to the housing is required.

In the operation of such storage banks having many clamping switches in parallel, it is necessary to identify expeditiously the switches that most often prefire so that these switches may be quickly corrected or replaced. A prefire-indicating system is thus required that will specifically indicate which clamping switch was the first to close. A system is also required which indicates a particular starting switch which may have failed when the capacitors of the storage bank discharge into the load. Another requirement is that there be a minimum of leads coupling the storage capacitor networks in the secured room to the indicating device in the control room where a given network may be specifically identified. With conventional indicating devices a lead from each of the networks to be sensed must be directly fed to the indicating device. Where high energies are involved expensive coaxial cables are required for each of the networks. With the technique of this invention, only a single pair of leads are needed between the secured room and the indicating device in the control room.

The general purpose of this invention is to provide a system that indicates which switch of a given bank of switches has prefired or failed. To attain this, the present invention contemplates a unique monitoring system wherein a sensing means is coupled between a charging means and each capacitor of a storage bank for sensing a current surge produced when a capacitor discharges through one of its associated switches. Upon detection of of current surge the sensing means applies a pulse to its associated section of an $n$-section delay line which is located in the secured room with the storage capacitors. A pulse travels from that section to both ends of the delay line with each delay line output pulse transmitted to one of two inputs of a system comprising a time interval gating circuit for providing an indication of the particular delay line section activated, and an output device for providing an indication of the particular switch which caused the discharge of a capacitor which in turn generated the current surge detected by the sensing means.

An object of the present invention is to provide a system for detecting and indicating the first current surge in one of a plurality of parallel networks.

Another object is to provide a system for indicating the particular network of a group of parallel networks in which the first current surge occurred.

A further object of the present invention is to provide a simple and reliable switch prefire and failure detection system.

Still another object is to provide a switch prefire and failure indication system which specifically indicates the particular network having the switch which has not closed at the proper time.

Yet another object is to provide a system that indicates which switch of a first group of switches was the first to close and also which switch of a second group of switches has failed to fire.

Other objects and many of the attendant advantages of this invention will be readily appreciated as the same becomes better understood by reference to the following detailed description when considered in connection with the accompanying drawing wherein:

The figure is a schematic diagram of the indicating system of this invention.

Referring now to the drawing there is shown the system of this invention together with a charging and discharging network to be monitored including a storage bank which comprises a series of capacitors C1–C$n$ each of which is charged through its respective resistor R1–R$n$. These resistors R1–R$n$ are connected in parallel to a high voltage source 11 through a relay contact 12. Relay contact 12 is controlled by relay coil 13 which is energized by voltage source 14 when push-button 15 is pressed. Each of the capacitors C1–C$n$ discharges through its respective starting switch K1–K$n$, when starting switches K1–K$n$ are simultaneously activated by trigger source 16, to energize low inductance load 21. A clamping switch S1–S$n$ is directely connected across each of the capacitors C1–Cn, respectively. Clamping switches S1–S$n$ are closed when activated by trigger source 18 which is energized by trigger source 16 after a time delay produced by time delay circuit 19. A pick-up coil L1–L$n$ is coupled to each of the leads which connect the capacitors C1–C$n$ to their respective resistors R1–R$n$. The pick-up coils L1–L$n$ sense the current change ($dI/dt$) and produce a signal which is applied to the input of their respective sections 1 through $n$ of $n$-section delay line 31, wherein each of the $n$-sections produces a delay $t$. The output of delay line 31 at section $n$ is connected to the Start side of a time interval gating circuit 32 which receives and gates timing pulses from oscillator 33 to a decade counter-indicator 34. The output of the other end of the delay line 31 at section 1 is coupled to the Stop input of gate 32 through a delay circuit 35 for producing a fixed delay $dt$, which is equal to the total delay, $nt$, of the $n$ sections plus another fixed time $kt$, so that $d=n+k$. Delay line 31 is connected in the circuit so that there is no delay to the Start input for the signal from the $n$th sensing means, while a delay of $t$ is provided for the signal from the first delay line section to the delay line output coupled to the Stop input. Gate 32 therefore gates timing pulses from oscillator 33 to the counter-indicator 34 only between the Start and Stop times. Gate 32 also has a reset input which is activated by push-button 37 for resetting the gate after a switch failure.

In operation, if $t$ equals the delay time per section of the delay line, the oscillator frequency is set at $$\frac{1}{2t}$$

pulses per second. A prefire at a given clamping switch causes the clamping switch to discharge its respective capacitor with a current rise time in the order of a fraction of a microsecond. There is then an initial $dI/dt$ through the resistor coupled to the capacitor which has discharged which is caused by either the recharging of the capacitor or by the current supplied to the clamping switch which has prefired if it is still conducting. As a result, the respective pick-up coil L senses the current change and generates a pulse at the input to its respective delay line section which pulse travels down the delay line to the Start input of gate 32 with a delay of $(n-x)t$, where $n$ is the total number of delay line sections, $x$ is the number of the particular delay line section activated, and $t$ is the delay time per section. Simultaneously, a pulse also travels up the delay line 31, through delay circuit 35 which produces a delay $dt$, to the stop input of gate 32 with a total delay of $(d+x)t$. The resulting time interval between Start and Stop is $$(d+x)t-(n-x)t=(d-n)t+2xt \qquad (1)$$

The counter indication is $$\frac{d-n+2x}{2} \qquad (2)$$

since the oscillator frequency is chosen as $1/2t$ pulses per second, i.e., one pulse for every two time delay increments. A reference starting point of $$\frac{d-n}{2}=\frac{k}{2} \qquad (3)$$

is used and the indicator of counter-indicator 34 is numbered so that the switch in the first position is indicated as $$\frac{k}{2}+1$$

Consequently, the actual indication is $x$, i.e., the number of the specific network having a faulty switch.

For purposes of explanation, assume clamping switch number 2, S2 in the drawing, of a 70-section delay line prefires, and also that delay circuit 35 has a fixed delay of 80$t$. The resulting pulse produced by pick-up coil L2 travels down the delay line 31 to the Start input of gate 32 with a delay of 68$t$. A pulse also travels up the delay line through sections 1 and 2 and through delay circuit 35, having a delay of 80$t$, for a total delay for the Stop side of gate 32 of 82$t$. The time increment during which gate 32 is opened is $82t-68t=14t$, in accordance with Equation 1. The counter then indicates a value of $14t/2t$ or 7 as defined by Equation 2. With the provision of the reference starting point of 5 in accordance with Equation 3, the indicator of counter-indicator 34 thereby indicates switch number 2(S2). Similarly, if clamping switch number 70 prefires, the pulse arrives at the Start input of gate 32 with no delay and at the Stop input of gate 32 with a total delay of $70t+80t=150t$. The total time increment is $150t$ and the total count is $150t/2t$ or 75. With a base starting point of 5, the actual indication is 70. To return gate 32 to its initial condition in preparation for receipt of the next start pulse, push-button 37 is pressed in order to reset gate 32.

An additional feature is provided where there are no clamping switch prefires but one of the starting switches K1–K$n$ fails to close when triggered by trigger source 16. It should be noted that high voltage source 11 is disconnected before the starting switches are triggered. The capacitor associated with a failing starting switch attempts to recharge the other capacitors and a reverse $dI/dt$ generates a signal which serves to indicate that a particular starting switch failed to fire. At that time a current change results in all other networks and pulses are simultaneously applied to their respective delay line inputs. These pulses are of a much smaller amplitude than the pulse produced by the reverse $dI/dt$ since the current has been distributed in accordance with the number of networks employed. Where, for example, 70 networks are utilized, the pulse produced in the network having the faulty starting switch is approximately 70 times the amplitude of the other pulses. It should also be noted that the large amplitude pulse is of opposite polarity to the other pulses. The pulses may be observed by means of an oscilloscope 38 or any other suitable display device. By properly selecting the vertical gain of the oscilloscope a series of similar polarity pulses is observed together with a large pulse of opposite polarity (which may not be observable on the oscilloscope due to its large amplitude relative to that of the other pulses) indicating the relative position of the network having the failing starting switch.

It is to be understood that any suitable sensing means may be employed in this system. Where an RC pickup is used in place of the coil, the prefire indication operates in the same manner but a voltage spike is produced to activate a particular delay line section. Such a pickup is useful in checking proper operation of the system when the switches have simultaneously fired.

In summary, the system of this invention senses a change in current occurring in one of several parallel networks and provides a specific indication of the particular network in which a surge first occurs. The invention is specifically described and illustrated with reference to capacitors which are charged in parallel by a voltage source and which discharge through an inductive load when the starting switches simultaneously closes. The system is specifically described in reference to the detection of a prefiring clamping switch or a failing starting switch. Nevertheless, the monitoring system of this invention may be utilized wherever it is desired to detect a current change in one of a plurality of parallel networks and to specifically indicate the network in which the current change occurred.

Obviously many modifications and variations of the present invention are possible in the light of the above teachings. It is therefore to be understood, that within the scope of the appended claims, the invention may be practiced otherwise than as specifically described.

What is claimed and desired to be secured by Letters Patent of the United States is:

1. A system for detecting a change in current in one of $n$ parallel networks and for specifically indicating the particular network in which the change in current first occurred, comprising:
   sensing means coupled to each of said $n$ networks for producing a signal indicative of a change in current,
   an $n$-section delay line having a first output at the first section and a second output at the $n$th section, together with an input at each of the $n$ sections coupled to receive the signal from said sensing means, each of the $n$ sections having an equal delay, and each section coupled to a respective sensing means, so that a received pulse is propagated in both directions to produce an output pulse at said first and second delay line outputs, and means coupled to said first and second delay line outputs for receiving said delay line output pulses for indicating the particular delay line section initially activated by the signal from said sensing means.

2. A system as set forth in claim 1 wherein said sensing means comprises an inductive means coupled in each of said $n$ networks.

3. A system as set forth in claim 1 wherein the means coupled to said first and second delay line outputs comprises:

time interval gating means having a start input, a stop input, a timing signal input, and an output, said start input coupled to said second delay line output, a delay circuit coupled between said first delay line output and said stop input of said time interval gating means, and a source of timing signals coupled to said timing signal input of said time interval measuring means, whereby a series of timing signals is present at the output of said time interval gating means for the duration of the time interval measured by said time interval gating means.

4. A system as set forth in claim 3 further including means for receiving the output signals from said time interval gating means for producing an indication of the delay line section activated by the signal produced by said sensing means.

5. The system as set forth in claim 4 wherein said means for receiving said output signals includes a counter-indicator which both counts the pulses received from said time interval gating means during the gated interval and which also produces a value representative of the particular delay line section activated.

6. A system for detecting a change in current in one of $n$ parallel networks and for specifically indicating the particular network in which the change in current first occurred, comprising:

$n$ sensing means, each of said $n$ sensing means coupled to one of said $n$ networks for producing a signal indicative of a change in current in its respective network, an $n$-section delay line having a first output at the first section and a second output at the $n$th section, together with an input at each of the $n$ sections coupled to receive the signal from one of said $n$ sensing means, each of said $n$ sections having an equal delay of $t$, and each section coupled to a respective sensing means with the propagation time delay for a signal received at a given delay line section, $x$, to the first output of said $n$-section delay line being $xt$, and wherein the propagation delay time for the same signal to the second output of said $n$-section delay being $(n-x)t$, time interval gating means having a Stop input, a timing signal input, an output, and a Start input coupled to said second delay line output, a delay circuit having a delay of $dt$ coupled between said first delay line output and said Stop input of said time interval gating means, and a source of timing signals for producing one pulse for every $2t$ coupled to said timing signal input of said time interval gating means, whereby the number of pulses produced at the output of said time interval gating means is $$\left(x+\frac{d-n}{2}\right)$$

7. The system as set forth in claim 6 further including a display device coupled to the Stop input of said time interval gating means.

8. The system as set forth in claim 6 further including counting means at the output of said time interval gating means for counting the pulses received during the time interval between the receipt of pulses at the Start input and the Stop input.

9. The system as set forth in claim 8 further including indicating means for specifically indicating a value $x$, which represents the particular delay line section of said $n$-section delay activated by a signal from one of said sensing means.

References Cited

UNITED STATES PATENTS

| | | | |
|---|---|---|---|
| 3,183,497 | 5/1965 | Whitby et al. | 340—213 |
| 3,257,651 | 6/1966 | Feisel | 340—167 B |

JOHN W. CALDWELL, *Primary Examiner.*

H. PITTS, *Assistant Examiner.*

U.S. Cl. X.R.

340—167, 213, 253